United States Patent Office 3,504,333
Patented Mar. 31, 1970

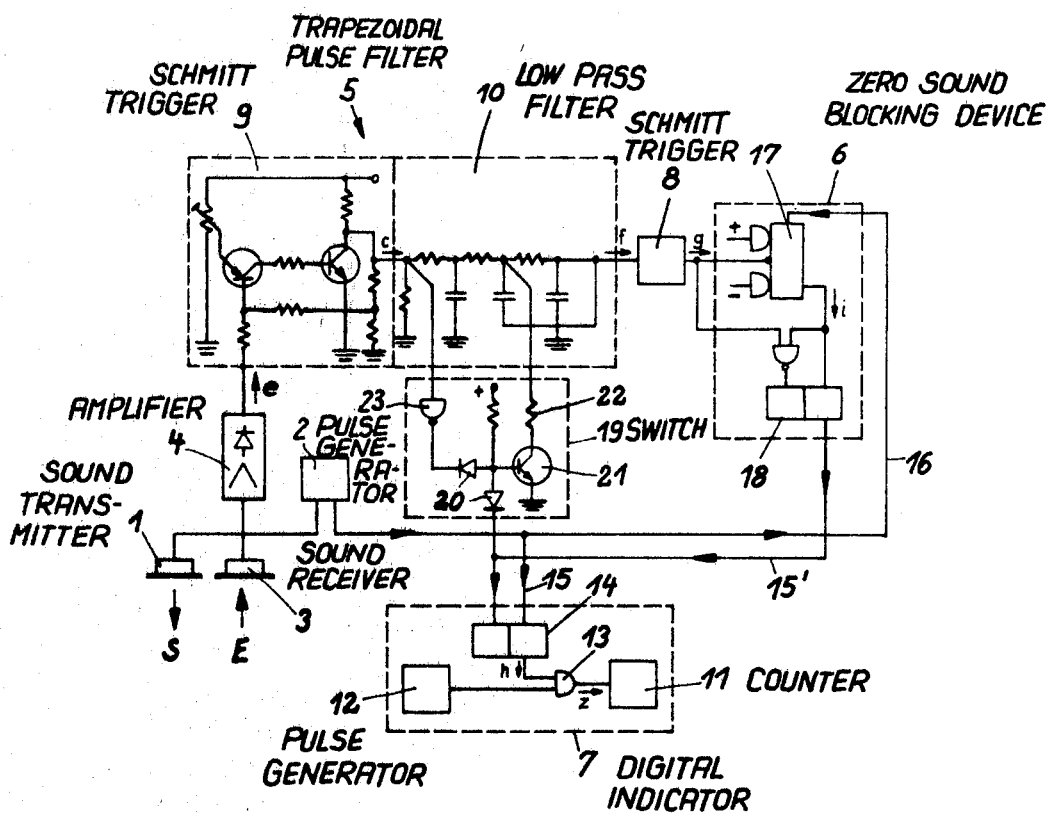

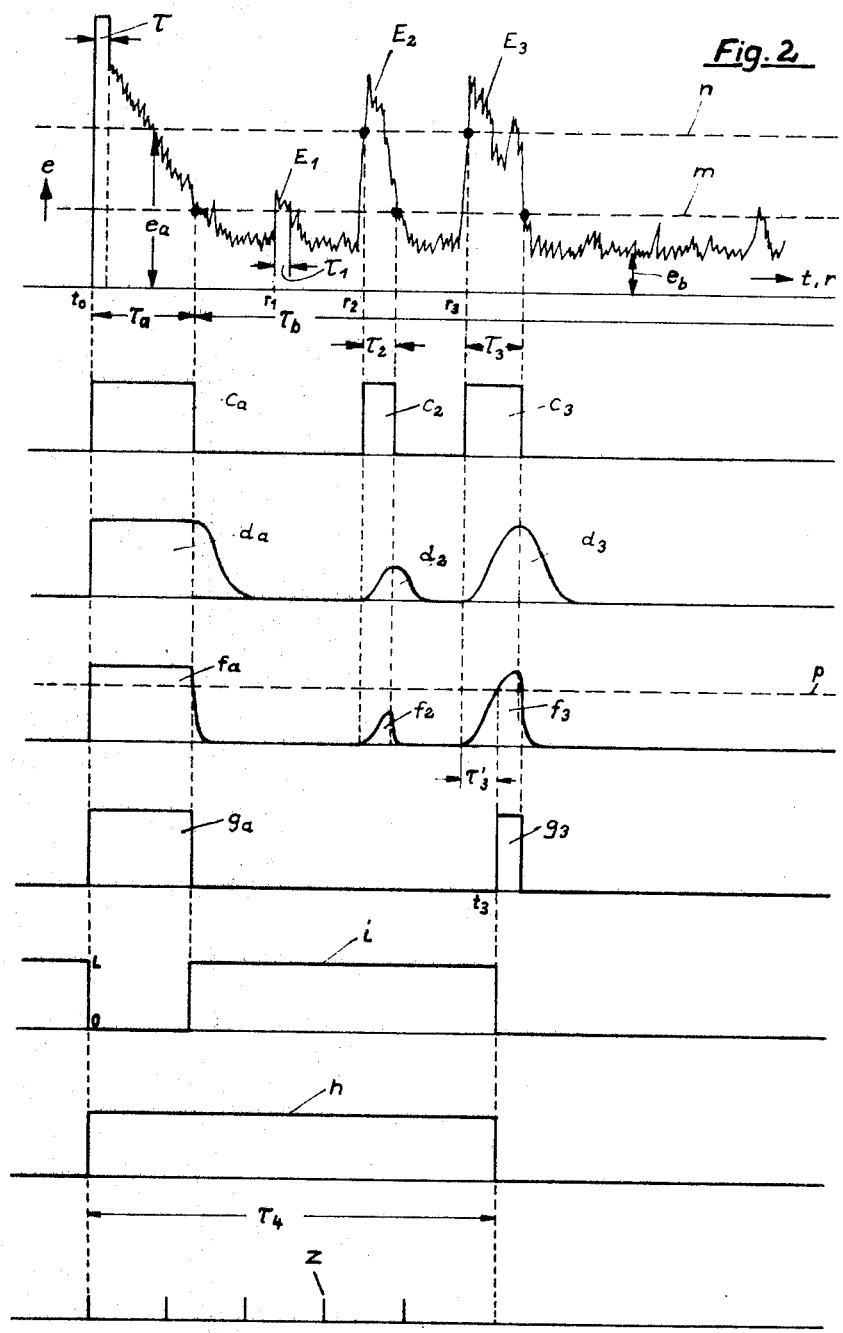

3,504,333
ECHO SOUNDING APPARATUS
Walter Grada and Wolfgang Richard Ernst Stedtnitz, Bremen, Germany, assignors to Fried. Krupp Gesellschaft mit beschrankter Haftung, Essen, Germany
Filed Oct. 14, 1968, Ser. No. 767,186
Claims priority, application Germany, Oct. 12, 1967, 1,566,852
Int. Cl. G01s 9/68, 9/70
U.S. Cl. 340—3                      7 Claims

ABSTRACT OF THE DISCLOSURE

An echo sounding arrangement using amplitude filtering for distinguishing between bottom echoes and echoes from submerged floating objects. This amplitude filter has a high actuating threshold and a low cutoff threshold.

BACKGROUND OF THE INVENTION

The present invention relates generally to the electronics art, and, more particularly to an arrangement for receiving echo sounder pulses which operates with a TVC and/or AVC amplifier, particularly with indication of the distance of objects of interest by means of a counter.

Counting mechanisms belong to the group of indicator devices which can indicate only one measured value at a time, in contradistinction to, for example, writing measuring mechanisms which are able to indicate a practically arbitrary number of measuring values occurring in chronological succession within a measuring period and being of varying magnitudes. If thus, as this is generally the case in echo soundings, there is present a chronological succession of received echo voltages, it is important to construct the device in such a manner that the counting mechanism responds only to that one of the many arriving echo signals during each measuring period, which originates from the reflecting object of interest. In the vertical echo sounding process in water this will generally be the echo coming from the bottom. In other cases, however, it is also intended to suppress the bottom echo and record the echoes received shortly before the bottom echo which originate from fish swimming above the bottom or from other submerged floating objects. When counting mechanisms are used or other measuring instruments which are actuated by a certain value, it is thus important to construct the receiving instrument to be selective in such a way that the counting mechanism responds only to one of perhaps an entire group of echo signals.

During vertical echo soundings as well as during horizontal sounds numerous more or less strong interfering pulses, i.e., interfering echoes from reflecting objects not of interest, occur in addition to the echoes from the bottom of the sea and from possible floating objects of interest disposed between the bottom of the sea and its surface. These interfering echoes form a more or less continuous noise level whose chronological course can take various shapes and depending on the prevailing conditions. The useful echoes differ from these interfering echoes, i.e., the bottom echo from echoes from possible interesting floating objects, first of all in their amplitude. It is thus the conventional practice to separate the useful echoes from the interfering echoes, particularly from the interfering echoes within the general noise level, by utilization of an amplitude filter having a fixed or variable actuation threshold. Such an amplitude filter, however, is insufficient or unreliable when echo signals are present which originate from different distances and which substantially exceed the general noise level, and the filtering is entirely useless when the echo signal belonging to the interesting object has a smaller amplitude than an earlier arriving echo from an uninteresting object. If the distance of such an interfering object is known, it can be prevented from being recorded by blocking out its distance range. For this purpose adjustable time blocking devices are provided.

A further significant differentiating feature for the useful echo is its duration which is derived from the duration of a signal pulse. To take advantage of this criterion, it is known to use pulse duration filters which pass only such received signals for recording whose duration is equal to or greater than the duration of the signal pulse. However, such a pulse duration filter is only suitable to suppress interfering pulses which are substantially shorter than the duration of the signal pulse. Such a pulse duration filter is employed in addition to the amplitude filter. As is evident from a consideration of FIGURE 2 of the attached drawing, which illustrates the characteristic course of the received voltage in a vertical echo sounding, the pulse duration of one and the same echo pulse is strongly dependent on the height of the amplitude threshold of the applied amplitude filter. When a certain amplitude threshold is assumed, pulse duration filtering seems useful only, for differentiating purposes, when this amplitude threshold is disposed closely above the general noise level where interference peaks of a duration which is short within the predetermined threshold range occasionally exceed this amplitude threshold.

SUMMARY OF THE INVENTION

It is an object of the invention to provide a pulse sounding arrangement which eliminates these disadvantages of the prior art.

Another object is to provide such a device in which echo pulses which are longer as well as those which are shorter than the echo pulse of interest can be eliminated.

The present invention is now based on the intention to utilize the dependency of the pulse width from the received amplitude for distinguishing the echoes originating from different objects. For the applicability of such a method it is important to consider the fact that the echo pulses are regularly initiated with a steep and high leading edge and subsequently fall more or less rapidly, but always less steeply than the initial leading edge. Based on this observation, it would thus be necessary to use amplitude thresholds of different levels in the rising leading edge and in the falling trailing edge during pulse duration filtering.

The present invention uses a known amplitude filter whose actuating threshold is substantially higher than its cutoff threshold and into whose input the rectified received signal $e$ is fed. Such an amplitude filter permits the derivation of pulses for recording whose duration is characteristic each time for the type of the reflecting object. It is particularly possible with such an amplitude filtering to provide a clear distinction between bottom echoes and echoes from floating objects located above the bottom of the sea.

It is known that echoes from floating objects in water are generally short whereas the bottom echo is of a substantially longer duration. The echoes from floating objects, such as fish or air bubbles, correspond in their position approximately to the length of the transmitted sound pulse. The bottom echo, however, is always considerably longer than the transmitted sound signal. This is due to the fact that the sound is not reflected as a single, sharply directional beam but in the form of a cone of sound, and that consequently with increasing depth an increasing area of the reflecting bottom is participating in the formation of the echo pulse. The echo components from the core of this reflecting bottom range, which core is located perpendicularly below the transmitter, arrive first and have the highest amplitude so that they are responsible for the creation of the initial edge of the bottom echo, whereas the echoes from the remaining range at the distance of the core region arrive consecutively later due to the increasing distance to be travelled and exhibit an amplitude which decreases with increasing distance from the core region. Consequently, the reflection of the transmitted pulse at the bottom of the sea results in a substantially trapezoidal course of the echo pulse with an amplitude which decreases from the leading edge to the trailing edge. The width of this trapezoidal pulse is, as should be quite evident, dependent on the size of the reflection surface and thus represents a characteristic for the expansion of the reflecting object. The application of an amplitude filter having a high actuating threshold and a low cutoff threshold thus represents a useful aid for the reliable derivation of indicator pulses of differing duration associated with the type of the reflecting object so that it is possible, in connection with such an amplitude filter, to realize an effective separation of such trapezoidal echo pulses by appropriate pulse duration selection.

The trapezoidal pulse filter can preferably comprise a Schmitt trigger having an appropriately different actuating and cutoff threshold with subsequent pulse duration filter of conventional construction, for example, a pulse duration filter comprising a lowpass filter or integrating network. Principally, the arrangement according to the present invention, can serve to filter trapezoidal pulses of shorter as well as longer duration. The present invention has a particular significance for filtering out the long bottom echoes during vertical echo soundings where the depth of the sea is indicated by a counting mechanism.

BRIEF DESCRIPTION OF THE DRAWINGS

FIGURE 1 is a circuit diagram for a vertical echo sounder for digital measurements of the depth of the sea.

FIGURE 2 shows pulse diagrams to explain the operation of the arrangement of FIGURE 1.

DESCRIPTION OF THE PREFERRED EMBODIMENTS

An echo sounding arrangement is shown in FIGURE 1. It substantially comprises an underwater sound transmitter 1 for transmitting directional signal pulses S, the transmitter being connected to a pulse generator 2, an underwater sound receiver 3 for the echoes E returning from the sounding range with an amplifier 4 connected thereto. A combined amplitude and pulse duration filter 5 (called trapezoidal pulse filter below) is provided as is a circuit arrangement 6 for blocking the zero sound, and an indicator device 7 operating as a travel time counter to indicate the depth of the sea. An amplitude filter, preferably in the form of a Schmitt trigger 8 can be further connected between the trapezoidal pulse filter 5 and the device 6 for blocking the zero sound. Finally, a switch to 19 to change the time constant of the pulse duration filter is provided.

The signal pulses S transmitted from the underwater sound transmitter 1 have a substantially rectangular form of predetermined duration.

The received voltage appearing after transmission of the sound signal behind amplifier 4 has a shape shown, for example, in FIGURE 2 as the voltage $e$ in dependence on the travel time $t$ or on the distance $r$. This voltage course regularly comprises a first, so-called zero sound region $\tau_a$ having a more or less monotonously decreasing received amplitude $e_a$ and a subsequent region $\tau_b$, where voltage pulses $E_1$, $E_2$ and $E_3$ which exceed the generally uniform noise amplitude $e_b$ to different extents are superposed over this noise or interference level. These voltage pulses are generated in the water—unless they are caused by electrical interference—by reflection of the signal pulse on varying reflecting objects located at different distances from the transmitter. The amplitude as well as the shape of these echoes is characteristic for the type of the reflecting object. In the illustrated example the echo pulse $E_1$, for example, corresponds to the echo of a more or less large school of fish in the water at a depth $r_1$, the echo pulse $E_2$ corresponds to the echo from a floating object of limited dimensions at a depth $r_2$, for example the echo from the bottom cable of a fishing net, and the echo pulse $E_3$ corresponds to the echo from the bottom of the sea at a depth $r_3$.

In the present example, it shall be assumed that the depth of the sea $r_3$ is to be indicated by the digitally operating indicator device 7. Therefore, it is also necessary to suppress the echoes $E_1$ and $E_2$ from reflecting objects between the sound transmitter and the bottom of the sea in addition to the interfering voltages $e_a$ from the zero sound range $\tau_a$ and $e_b$ from the interference level range $\tau_b$ so that the indicator device 7 will not respond to these interfering voltages.

It must also be noted that in the above illustration of the voltage course $e=f(t)$ it has been presumed, without so stating, that the amplifier 4, as this is the usual practice for echo soundings, operates with a TVC and/or AVC control by means of which the degree of amplification is increased to such an extent depending on the travel time that the decrease in the received amplitude connected with the travel time or distance from the transmitter is compensated.

The basic width $\tau_1$, $\tau_2$, of the echoes $E_1$ and $E_2$ substantially corresponds to the width or duration $\tau$ of the signal pulse S since the associated reflecting objects have relatively small dimensions whereas the basic width $\tau_3$ of the bottom echo $E_3$ is larger by a multiple than the width or duration $\tau$ of the signal pulse. All three echo pulses $E_1$, $E_2$ and $E_3$ have a substantially trapezoidal form with steep leading edge, high initial amplitude and a final amplitude which decreases more or less strongly to the trailing edge.

In order to record such trapezoidal pulses in their total width, the receiver arrangement must operate with a threshold which is also exceeded by the low trailing edge of the trapezoidal pulse.

This amplitude threshold $m$, however, is disposed so closely above the interference level $e_b$ that it is useful to associate a higher threshold with the lower threshold $m$ in order to initially suppress all echo pulses below the higher threshold $n$, in the present case the echo pulse $E_1$. Consequently, it is then only necessary to separate the echo pulses exceeding the higher threshold, in the present case to separate the echo pulses $E_2$ from $E_3$. Since the leading edge of the echo pulses is always very steep, and since the echo pulse reaches its peak value at the start, the trapezoidal pulse filter 5 is so constructed that it is actuated by the leading edge of the echo pulses when they exceed the higher threshold $n$. For the pulse duration, however, the decrease of the pulse amplitude to below the lower threshold $m$ is determinative. Thus the trapezoidal pulse filter 5 is further constructed so that it will not cut off when the pulse falls again below the higher threshold $n$, but rather when it falls below the lower threshold $m$. In this way, the entire pulse duration between the leading edge and the trailing edge of the pulse is covered by the trapezoidal pulse filter 5. To accomplish this function, a pulse generator in the form of a Schmitt trigger 9 is provided in this filter, which Schmitt trigger possesses, in a known manner, a high hysteresis in that its input and output threshold substantially differ from each other.

The receiving voltage $e_a$ in the zero sound range $\tau_a$ also has the basic form of a trapezoid with a steep leading edge and monotonously decreasing amplitude toward the end and would thus also be evaluated by the trapezoidal pulse filter 5, in the same manner as the echo pulses $E_2$ and $E_3$ and might also be recorded. Since in the present case only the bottom echoes $E_3$ are to be recorded and furthermore the zero sound is always uninteresting, the circuit 6 for blocking the zero sound is provided. This circuit influences the counter circuit for evaluating the measurement in such a manner that it does not respond to the zero sound, as will be further explained below.

At the output of the Schmitt trigger 9, the echo pulses $E_2$ and $E_3$ result in the described pulse formation of rectangular pulses $c_2$ and $c_3$. These rectangular pulses are fed into a lowpass filter 10 within the trapezoidal pulse filter 5 in order to determine their pulse duration. At the output of the lowpass filter or of the trapezoidal pulse filter, signals corresponding to $d_2$ and $d_3$ could thus be expected. However, the lowpass filter is provided, as is suitable in the present case, with a small discharge time constant; thus, instead of pulses $d_2$ and $d_3$ which rise and fall symmetrically, pulses $f_2$ and $f_3$ with a steep trailing edge result. These pulses reach the subsequently connected Schmitt trigger 8 which is constructed as a pulse generator and which can have the same configuration as the pulse generator 9 but need not have a large hysteresis as required for pulse generator $p$, it rather operates with a simple amplitude threshold $p$. At the output of this Schmitt trigger 8 only the rectangular pulse $c_3$ which is derived from the echo pulse $E_3$ remains since the pulse $f_2$ resulting from echo pulse $E_2$ no longer reaches the threshold $p$. This effect is due to the fact that an integration takes place in the lowpass filter 10 because of which the voltage gradually increases so that a higher final voltage appears with longer-duration pulse $c_3$ than with the shorter-duration pulse $c_2$.

The indicator device 7 comprises an actual counting mechanism 11, to which counting pulses are fed by a pulse generator 12 via a gate 13 during the sound travel time to be measured, i.e., between transmission of the signal pulse S and arrival of the echo pulse $E_3$ ($g_3$), i.e., during the time period $\tau_4$, so that at the end of interval $\tau_4$ it counts and records the time-counting pulses $z$ emitted by the pulse generator during this interval. If the time-counting pulses are emitted at intervals in which the sound travels a distance of twice 10 cm. in water, the counting mechanism 11 will digitally indicate the depth $r_3$ of the water to be exact within 10 cm. The time error $\tau'_3$ appearing during conversion of the pulses $f_3$ is within the measuring tolerances.

A flip-flop 14 opens gate 13 during the interval $\tau_4$. For this purpose flip-flop 14 is controlled, via a line 15, by pulse generator 2 at time $t_0$ and is brought into a position in which a pulse voltage $h$ is present at gate 13 via the output of flip-flop 14 which voltage opens that gate. This voltage remains in force until, at time $t_3$, the rectangular pulse $g_3$ derived from the echo pulse $E_3$ travels from the output of the Schmitt trigger 8, via the zero sound block 6 and line 15′, to flip-flop 14.

The zero sound block 6 which was mentioned several times above operates as follows: In the zero sound range a zero sound pulse $e_a$ appears, as already mentioned above, at the output of the trapezoidal pulse filter 5, which zero sound pulse is converted in lowpass filter 10 into a pulse $f_a$ and which appears at the output of the Schmitt trigger 8 as a rectangular pulse $g_a$. This rectangular pulse $g_a$ travels, as does the pulse $g_3$ which is derived from the echo pulse $E_3$, to the zero sound block 6. This zero sound block is further controlled, via line 16 and at time $t_0$, by the starting pulse for the counting mechanism which travels via the control line 15 to the indicator device 7. The controlled zero sound block is so constructed that passage of the pulses coming from Schmitt trigger 8 and travelling to indicator device 7 is suppressed during the zero sound range $\tau_a$. The signal pulse S, or the simultaneously emitted control pulse from pulse generator 2, first sets the output voltage $i$ of a JK-flip-flop 17 to zero. Only when the zero sound falls below the threshold $m$ at the end of the zero sound range $\tau_a$ is the output of the JK-flip-flop 17 which is simultaneously controlled by the pulse generator 2 and by the output of the Schmitt trigger 8 changed so that now the pulse voltage $i$ with the L signal appears at the output of flip-flop 17. This pulse voltage controls a further flip-flop 18 which switches the input flip-flop 14 of the indicator device 7 as soon as pulse $g_3$ from Schmitt trigger 8 is added to pulse $i$.

In order to form pulses $f_2$ and $f_3$ with steep trailing edges in the lowpass 10, a switch 19 is provided for the time constant of the lowpass 10. This switching occurs in dependence on the position of the JK-flip-flop 17. Switching to a smaller time constant with the aid of switch 19 occurs if after completion of the zero sound the output of flip-flop 17 receives an L potential by switching the output of the Schmitt trigger 8 to zero. However, in order not to reduce the charge time constant during the duration of an echo pulse, the time constant is reset to "large" for the duration of the echo. This requirement is met by the formation of an AND linkage between the two signals from flip-flop 17 and from Schmitt trigger 8 via line 15′ in switch 19. At the end of the zero sound range $\tau_a$ the lowpass filter 10 is correspondingly switched from a higher to a lower discharge time constant whereas the charging time constant always remains the same. The AND function conditions for the input of the diode gate 20 state that the output of the JK-flip-flop 17 and the output of the Schmitt trigger 9, turned in phase by 180° by a negator 23, both be positive so that a resistor 22 disposed in the collector circuit is parallel-connected with the lowpass filter 10 via a transistor 21 and thus the discharge time constant is reduced. The charging time constant, however, is not influenced because the AND function conditions are not met at the diode gate 20 in position L of Schmitt trigger 9.

Many modifications and other embodiments are possible within the framework of the present invention. It is particularly possible to modify the arrangement with known means so that it is not the pulses of longer duration which are indicated in the counter but those of shorter duration, or that both pulses are fed, via separate chanels, to different indicator devices, for example, separate counting mechanisms, so that the longer as well as the shorter echo is recorded.

We claim:

1. In a device for receiving echo sounding pulses having a counter for indicating the distance of selected objects, the improvement comprising trapezoidal pulse filter means having an actuating threshold which is substantially higher than its cutoff threshold and connected to receive an input signal representative of the echo sounding pulses received by said device, said trapezoidal pulse filter means including: a pulse amplitude filter connected to receive such input signal for initiating an output pulse each time the value of the input signal exceeds said actuating threshold and for terminating such pulse when the value of the input signal subsequently falls below said cutoff threshold; and a pulse duration filter connected for producing an output signal proportional to the length of each such sounding pulse, whereby when the output signal from said pulse duration filter exceeds a predetermined value, an indication of the presence of a selected object is produced.

2. The improvement defined in claim 1 wherein the device includes means for emitting a sound pulse which leads to the echo sounding pulses and for starting the counter simultaneously with the emission of such sound pulse, and said pulse amplitude filter includes a Schmitt trigger having large hysteresis with regard to its switching threshold and said pulse duration filter includes a lowpass filter connected to the output of said Schmitt trigger for permitting passage therethrough only of output pulses of a predetermined minimum duration thereby to control the production of a signal for stopping the counter.

3. The improvement defined in claim 2, comprising an amplitude filter connected to the output of said trapezoidal pulse filter means.

4. The improvement defined in claim 3 wherein said amplitude filter is a Schmitt trigger.

5. The improvement defined in claim 3, comprising switch means connected to said lowpass filter for changing its discharge time constant to a smaller value at the end of the pulse.

6. The improvement defined in claim 5 wherein said switch means includes a resistance connected in parallel with said lowpass filter and a selectively conductive transistor connected in series with said resistance.

7. The improvement defined in claim 6, comprising JK-flip-flop means for causing said transistor to be conductive as soon as the output of the flip-flop means assumes a preselected condition after termination of a zero sound period and no echo has been passed by the trapezoidal pulse filter means.

References Cited

UNITED STATES PATENTS

| | | | |
|---|---|---|---|
| 3,309,650 | 3/1967 | Ross et al. | 340—3 |
| 3,329,932 | 7/1967 | Auer et al. | |
| 3,343,167 | 9/1967 | Rademacher | 343—17.5 |

OTHER REFERENCES

Cooke, The Radio and Electc. Engr., June 1967, pp. 353–360.

RICHARD A. FARLEY, Examiner

U.S. Cl. X.R.

343—13